United States Patent [19]

Bartlett

[11] 4,047,808
[45] Sept. 13, 1977

[54] ADJUSTABLE SLIT MECHANISM

[75] Inventor: Ivan Robert Bartlett, East Burwood, Australia

[73] Assignee: Varian Techtron Proprietary Limited, North Springvale, Australia

[21] Appl. No.: 711,349

[22] Filed: Aug. 5, 1976

[30] Foreign Application Priority Data

Aug. 13, 1975 Australia .............................. 2769/75

[51] Int. Cl.$^2$ ........................ G01J 3/04; G05D 25/00
[52] U.S. Cl. .................................................. 350/271
[58] Field of Search ........................................ 350/271

[56] References Cited
FOREIGN PATENT DOCUMENTS 2,438,834  3/1975  Germany .............................. 350/271

Primary Examiner—F. L. Evans

Attorney, Agent, or Firm—Stanley Z. Cole; Gerald M. Fisher; John J. Morrissey

[57] ABSTRACT

A slit device for use in optical systems, and in particular for use in spectrophotometers. The device comprises an integral plate structure having two jaw assemblies, each of which includes two jaws arranged to define a slit between them, and flexible hinge means interconnecting the two jaws to permit relative movement such that the slit width can be varied. Each hinge means includes a part of the plate structure which has been turned on edge relative to the plate structure parts forming the associated jaws so as to have maximum flexibility in the general direction of relative movement of the jaws. Two bridging portions are also formed as integral parts of the plate structure, and each bridging portion connects one of the jaws of one jaw assembly with a jaw of the other assembly. Thus, movement of one jaw in one assembly is transmitted to a jaw of the other assembly through one of the bridging portions.

12 Claims, 5 Drawing Figures

ADJUSTABLE SLIT MECHANISM

This invention relates to slit defining means as used in spectrophotometers and other instruments and apparatus having an optics system which requires the provision of an adjustable aperture. The invention is also concerned with mechanism incorporating slit defining means. One particular application of adjustable slit mechanism is in monochromators as used in spectrophotometers and other instruments and apparatus, and it will be convenient to hereinafter describe the invention in relation to that example application.

Spectrophotometer monochromators require the provision of a narrow rectangular slit which has straight parallel longitudinal edges, and it is preferred that the slit width be adjustable. Many attempts have been made to develop satisfactory adjustable slit mechanism for such monochromators, but prior to the present invention the commercially available mechanisms have been of complex and expensive construction and/or not entirely satisfactory in operation. A difficulty has existed in providing means whereby the jaw width can be adjusted over a suitable range while maintaining the desired parallelism between the longitudinal edges. The slit is defined between two jaws, and the mechanism is either unilateral in which one jaw only is movable relative to the other, or bilateral in which both jaws are movable.

Bilateral mechanisms are generally preferred, but up until recently any effective mechanism of that kind was complex and expensive. A simple yet effective bilateral mechanism forms the subject of U.S. Pat. No. 4,017,162 to Mills, which has been assigned to the same assignee as the present application. That mechanism includes a plate having two opposed and spaced jaw sections between which the optical slit is defined, and hinge means which is integral with and interconnects the two jaw sections so that they are capable of relative movement. Thus, the hinge and jaw sections form respective parts of a single plate.

In the aforementioned construction, the hinge has its greatest flexibility in a direction transverse to the axial direction in which the two jaw sections move relative to each other. That is, the hinge, being part of the plate which forms the jaw sections, has its broad surfaces coplanar with the broad surfaces of the jaw sections. As a result, the resistance to relative movement of the jaw sections is greater than is desirable for optimum effect.

It is a principal object of the present invention to provide a slit member of the kind described above, but in which there is substantially less resistance to jaw movement.

According to the present invention, there is provided an optical slit device comprising an integral plate structure having two jaw assemblies, each of which includes two jaw sections arranged to define a slit between opposed edges of the respective parts of the plate structure from which the jaw sections are formed, and flexible hinge means interconnecting the two jaw sections so as to permit relative movement between them such that the width of the slit can be increased and decreased; each hinge means including a part of the plate structure which has been turned on edge relative to the plate structure parts forming the associated jaw sections; and two bridging portions, each of which connects a jaw section of one assembly with a respective said jaw section of the other assembly.

In a preferred arrangement of the foregoing construction, each hinge has its maximum flexibility in the direction of movement of the jaw sections. When the device is arranged for use, the jaw sections are slidably interposed between two opposed mounting surfaces, and a recess or gap is provided in one of those surfaces to accomodate each of the upturned hinges, and is dimensioned to permit adequate lateral flexing of the respective hinge.

It will be convenient to hereinafter describe the invention by reference to a slit plate of the kind particularly described in the aforementioned U.S. Pat. No. 4,017,162. In that form of optical device, the jaws form an integral part of a plate or foil composed of a rectangular sheet of metal such as beryllium-copper alloy, although it may be made of other materials. The foil defines two separate jaw assemblies, each including two jaws which will be hereinafter referred to as right and left hand jaws respectively for convenience of description. The provision of two jaw assemblies permits a balanced arrangement as will be clear from the following description, and also permits the mechanism to be used in a dual-slit construction.

The essential features of the invention, and further optional features, are described in detail in the following passages of the specification which refer to the accompanying drawings. The drawings, however, are merely illustrative of how the invention might be put into effect, so that the specific form and arrangement of the features (whether they be essential or optional features) shown is not to be understood as limiting on the invention.

Figures 1, 2:
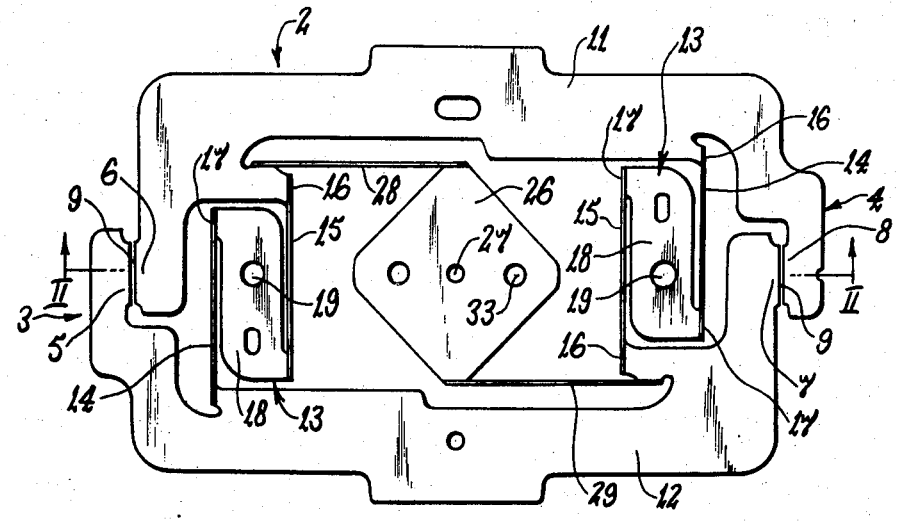
FIG. 1 is a plan view of an example slit device incorporating the present invention.
FIG. 2 is a longitudinal sectional view taken along line II—II of FIG. 1.

Each of the jaw assemblies 3 and 4 of the preferred embodiment shown in the drawings is located at a respective end of the foil 2, and is formed by two sections of the foil that are separated by gaps or parting lines formed in the foil 2. The two sections constitute jaw sections, which are identified as 5 and 6 in assembly 3, and 7 and 8 in assembly 4. One of the gaps of each assembly 3 and 4 constitutes the slit, which is identified as 9 in both assemblies, and is defined between opposed edges of the respective two jaw sections, 5 and 6 or 7 and 8, that are straight and extend substantially at right angles to the longitudinal axis of the foil body. The two right hand jaws 6 and 8 are connected by a bridging section 11 of the foil 2 which, in the construction shown, extends along one longitudinal side of the foil body, and the left hand jaws 5 and 7 are connected by another bridging section 12 extending along the other longitudinal side of the body. Each bridging section 11 and 12 is preferably in the form of a band of the foil material having a width such as to resist lateral deflection or buckling when subjected to a longitudinal compressive force. The jaw sections connected by each bridging section are also preferably of such a width as to resist relative movement between any of the three sections in a direction contained within the plane of the foil. Thus, the peripheral shape and relative positions of those three sections (6, 11 and 8, or 5, 12 and 7) are maintained under the forces encountered during adjustment, as will be hereinafter explained.

The two jaws of each jaw assembly 3 and 4 may constitute a terminal end section of the foil 2 as is shown, and the arrangement is such that in assembly 4 the right hand jaw 8 is outermost, whereas in the other assembly 3 the left hand jaw 5 is outermost. Each jaw assembly 3 and 4 also includes hinge means 13 which provides the only connection between the two jaws of that assembly, except perhaps for an indirect connection through drive means for effecting relative movement of the jaws.

In the preferred embodiment shown, each hinge means 13 includes two hinge arms 14 and 15, each of which is connected at one end 16 to a respective jaw and at the other end 17 to a common junction section 18. Each hinge arm 14 and 15 is preferably a narrow substantially straight striplike part of the foil, and the connection 16 with the jaw may be direct or indirect through the intermediary of the associated bridging section 11 or 12. The hinge arms 14 and 15 are preferably substantially parallel as shown, extending generally transverse to the longitudinal axis of the foil, and the junction connection 17 of each is adjacent the jaw connection 16 of the other. Also, each hinge arm 14 and 15 is turned on edge, preferably by bending the two end connections 16 and 17, so that its broad surfaces are substantially normal to the plane of the foil.

Each junction section 18 of the construction shown is relatively broad in area to provide a rigid base for the two hinge arms 14 and 15, and is preferably located on the longitudinal axis of the foil body, which axis may also bisect each of the two slits 9. The arrangement may be such that each hinge means 13 is substantially symmetrical about both the longitudinal and transverse axis of the associated junction section 18. If desired, an aperture 19 may be provided through each junction section 18 to receive a clamping pin 20 (see FIG. 5) which is effective to firmly clamp the respective junction 18 between the two mounting surfaces 21 and 22 (see FIG. 4), thereby restraining the junction sections 18 against substantial movement relative to the mounting surfaces 21 and 22. Each aperture 19 may be elongated in the longitudinal direction of the foil body so that there is sufficient tolerance to permit the junction sections 18 to be clamped without prestressing the foil body, and particularly the hinge arms 14 and 15.

In use the foil 2 is interposed between two flat mounting surfaces 21 and 22, each of which may be defined by a respective plate or block 23 and 24 (FIG. 4) of suitably rigid material. An aperture or recess 25 is provided in each plate or block 23 and 24 to leave a clear sight passage through each slit 9. Because of the confinement of the foil 2 between the two mounting surfaces 21 and 22, the slit jaws 5 and 6, and 7 and 8, are maintained coplanar, but are permitted relative movement as is hereinafter explained.

Movement of the jaws of each assembly 3 and 4 is effected through drive means which may be of any suitable construction, but in the preferred arrangement shown that means includes a member 26 formed as an integral part of the foil 2. In that particular arrangement, the drive member 26 is defined by a central portion of the foil body which has a generally quadrilateral (preferably square) peripheral shape, but may be circular or any other peripheral shape. An aperture 27 may be provided through the center of the drive member 26 to receive a locating pin (not shown) connected to the mounting plates or blocks 23 and 24, and that aperture 27 preferably defines the centre of the foil body. Furthermore, the aperture 27 should preferably be dimensioned so that the drive member 26 is adapted to rotate freely about the locating pin.

In an alternative construction (not shown), the drive member may have openings formed therethrough to define a wheel-like device having hub and rim portions joined by a plurality of spoke portions. Preferably, four spokes are provided in equally spaced relationship, and two of those spokes extend along the longitudinal axis of the foil body (see for example FIG. 3 of the aforementioned U.S. Pat. No. 4,017,162).

The drive member 26 is preferably connected to the jaw assemblies 3 and 4 through two control straps 28 and 29, each of which extends in the longitudinal direction of the foil body adjacent a respective one of the bridging sections 11 and 12. In the particular arrangement shown, each control strap 28 and 29 has one end connected to and formed integral with one jaw, preferably the innermost jaw, of a respective one of the jaw assemblies 3 and 4. The other end of each control strap 28 and 29 is connected to a respective opposite side of the drive member 26 through a connecting section of the foil body which is preferably located on a central transverse axis of that body — i.e., an axis extending substantially at right angles to the longitudinal axis of the foil body and passing through the center thereof.

It will be appreciated that movement of the drive member 26 about the axis of aperture 27 will tend to move the two control straps 28 and 29 longitudinally but in opposite directions. Thus the strap 28 will tend to move the two right hand jaws 6 and 8 in one direction, whereas the other strap 29 will tend to move the two left hand jaws 5 and 7 in the opposite direction.

Preferably, the opposed edges of the jaws 5 and 6, and 7 and 8, of each jaw assembly 3 and 4, respectively, are in abutment, or the zero slit width position, when the drive member 26 is at rest — i.e., when the control straps 28 and 29 are not under compression or tension. It is further preferred that both control straps 28 and 29 are subjected to tension when the drive member 26 is turned to open the jaw assemblies 3 and 4. The stresses thereby build-up in the foil then function to bias the jaw assemblies 3 and 4 into the rest or zero width position. It is to be understood that, in some situations, the jaws may not be completely closed at the zero width position, but a very fine space may exist between them.

In the arrangement just described, the jaw slits 9 may be formed by shearing the foil sheet along appropriate lines.

Turning movement of the drive member 26 may be effected through any appropriate actuating means 31. In the embodiment shown in FIGS. 3 and 4, that means 31 comprises a screw device, such as a micrometer head, secured to a support and connected to a peripheral portion of the drive member 26 by a pin 32 engaging in an opening 33 formed near the periphery of the member 26 and located on the longitudinal axis of the foil body. The axis of the screw device 31 preferably extends transverse to the longitudinal axis of the foil body, as is shown, so that adjustment of the device 31 causes turning movement of the member 26. A separate screw device (not shown) may be connected to the opposite side of the drive member 26, also at a point on the longitudinal axis of the foil body. The use of micrometer heads for the (or each) screw device 31 facilitates calibration of slit width, but it will be appreciated that other means may be employed for that purpose. It is preferable to have the (or each) actuator 31 connected to the drive member 26 so that the member 26 is restrained against movement relative to the connecting pin 32 of the acutator 31. That may be achieved by means of a clearance-free opening 33 or by spring means urging the jaws 5 and 6, 7 and 8, into the open position.

Figure 3:
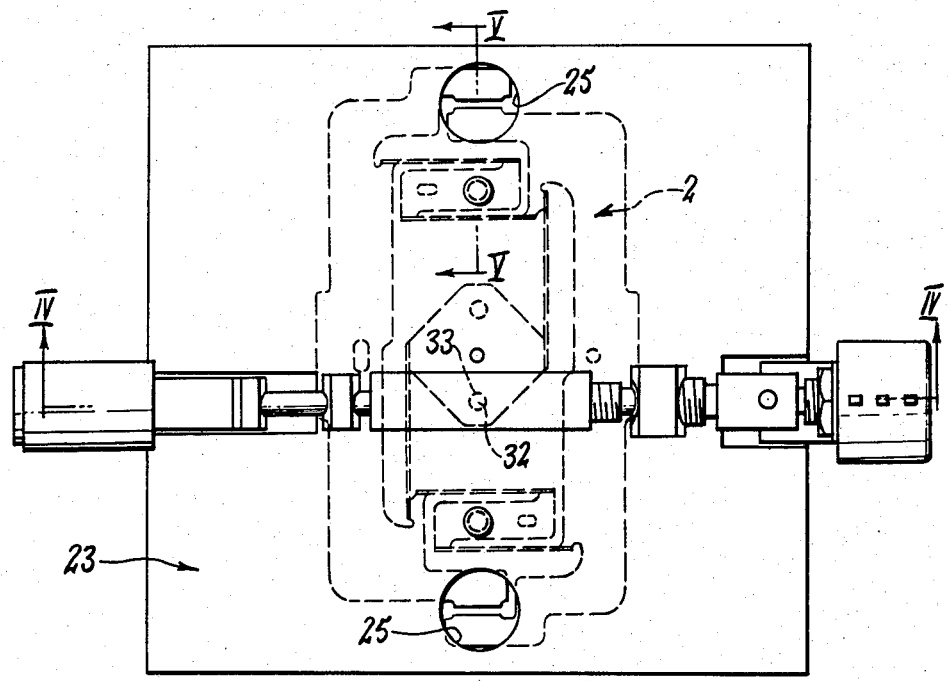
FIG. 3 is a semi-diagrammatic plan view of one form of optical slit mechanism including the device of FIG. 1.
Figure 4:
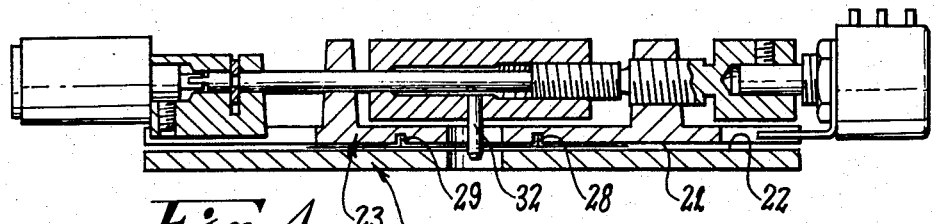
FIG. 4 is a sectional view taken along line IV—IV of FIG. 3.
Figure 5:
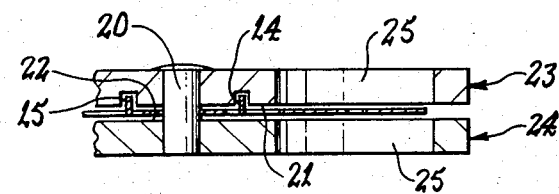
FIG. 5 is a sectional view, shown on an enlarged scale, taken along line V—V of FIG. 3.

The actuating means 31 shown in FIGS. 3 and 4 is described in detail the aforementioned U.S. Pat. No. 4,017,162 in, but is shown by way of example only, as the actuating means 31 may take numerous forms other than a screw device. For example, the actuating means may comprise a servo-motor connected to the drive member 26 and operated through a digital means such as to permit the operator to select a particular slit width.

In the embodiment particularly described, the foil is made from a single piece of material such that the jaws, hinges, control straps, and drive wheel, are all formed integral. The invention may be embodied in varieties of that construction, however, such as one in which the foil provides a mounting for separately formed jaw elements. The drive wheel, or an equivalent member, may be also formed separate from the foil and secured thereto as required. In addition, eyelets or the like may be fixed within apertures of the foil which are subjected to stress so as to guard against wear and/or fracture.

Furthermore, the drive member may be a straight bar rather than a wheel-like device, and in that event the bar may extend between and be pivotably connected to the two control straps or to the bridging sections. Many other constructional variations are available, since the basic aim of the invention is satisfied as long as the jaw mountings and interconnecting hinge portions or supports are formed integral from a thin sheet or foil such as to permit flexure of those hinge portions in the plane of the foil.

According to yet another modification, the jaw assemblies may be arranged so that one slit opens as the other closes. Still further, in the construction particularly described, the two slits may have different widths at any one point of time. Furthermore, the present invention can be applied to any of the slit devices (foils) described in the aforementioned U.S. Pat. No. 4,017,162.

A foil as described may be made in any appropriate manner, such as by stamping, chemical milling, electrochemical milling or photo-etching. The latter method has been found to be satisfactory in that it provides accurate jaw edges and is relatively inexpensive.

A slit mechanism according to the invention has numerous advantages. For example, it provides an accurate bilateral construction at minimum cost. Furthermore the jaws are coplanar in all positions of adjustment and movement of the jaws is substantially linear. The symmetry of the hinge means provides a parallelogram-type linkage whereby the jaws are maintained substantially parallel when moved.

Finally, it is to be understood that various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. An optical slit device comprising a generally planar plate structure, said plate structure being elongate along a longitudinal axis and having first and second jaw assemblies, said first jaw assembly being disposed near one end of said plate structure and said second jaw assembly being disposed near the other end of said plate structure along said longitudinal axis, each of said jaw assemblies including two jaw sections arranged to define a slit between opposed edges of respective parts of the plate structure from which said jaw sections are formed, and flexible hinge means interconnecting the two jaw sections of each jaw assembly so as to permit relative movement between said jaw sections such that the width of said slit can be changed; each hinge means including an elongate arm structure oriented generally transverse to said longitudinal axis of said plate structure, said arm structure having a generally planar surface that is substantially perpendicular to said jaw sections; said plate structure further comprising two bridging portions, each of said bridging portions connecting a jaw section of one of said jaw assemblies with a jaw section of the other of said jaw assemblies.

2. The optical slit device of claim 1, wherein said arm structure is configured as a narrow strip extending substantially parallel to said slit.

3. The optical slit device of claim 1, wherein said hinge means comprises two of said arm structures, with each of said arm structures having one end connected to a respective one of said jaw sections and an opposite end connected to a junction section, said junction section being disposed between the two arm structures.

4. The optical slit device of claim 1, wherein each of said bridging portions connects the innermost jaw section of one of said jaw assemblies to the outermost jaw section of the other of said jaw assemblies.

5. The optical slit device of claim 1, wherein said plate structure includes a drive member that is connected to each of said jaw assemblies.

6. The optical slit device of claim 5, wherein said drive member is connected to each of said first and second jaw assemblies through first and second control straps, respectively, each control strap being connected at one end to said drive member and at the opposite end to a jaw section of one of said jaw assemblies.

7. The optical slit device of claim 6, wherein each control strap extends transverse to the slit of the jaw assembly to which said control strap is connected, and wherein each control strap comprises a generally planar surface that is substantially perpendicular to said plate structure.

8. The optical slit device of claim 7, wherein the slit defined by the two jaw sections of each jaw assembly has zero width when said drive member is at a rest position, and wherein movement of said drive member in one direction from said rest position causes an increase in the width of said slit, and wherein said control straps are under tension at any position of said drive member at which the width of said slit is greater than zero width.

9. A double slit mechanism for an optical system, said mechanism including, in combination, the optical slit device of claim 1, and an actuator means connected to each of the jaw assemblies of said device, said actuator means being operable to move a jaw section of each jaw assembly so as to vary the width of the two slits.

10. The double slit mechanism of claim 9, wherein the plate structure of said optical slit device includes a drive member that is connected to each of said jaw assemblies, and wherein said actuator means is connected to said drive member and is operable to cause rotation of said drive member about an axis located intermediate the connections between said drive member and the two jaw assemblies.

11. The double slit mechanism of claim 10, wherein said actuator means includes a pin secured to a movable member and connected to said drive means at a position lateral of said rotational axis, said pin extending substantially parallel to said rotational axis, a spindle drivably connected to an actuator motor and threadably connected with both said movable member and a nut spaced from said moveable member and secured to a fixed member, said spindle extending transverse to said rotational axis, the pitches of the two threaded connections being different so that rotation of said spindle causes said movable member to move relative to said spindle in the axial direction of said spindle, thereby causing rotation of said drive means.

12. The double slit mechanism of claim 9, wherein the plate structure of said optical slit device is located between two substantially flat and parallel mounting surfaces arranged in opposed spaced relationship, and wherein at least part of each of said jaw sections is slidably located between said mounting surfaces and is confined by said mounting surfaces so as to maintain said jaw sections substantially coplanar.

* * * * *